(12) United States Patent
Edwards

(10) Patent No.: US 10,608,926 B2
(45) Date of Patent: Mar. 31, 2020

(54) METHOD AND APPARATUS FOR PRECISELY SOURCE-TIMED NETWORK FLOW SWITCHING

(71) Applicant: Fox Broadcasting Company, Los Angeles, CA (US)

(72) Inventor: Thomas G. Edwards, Los Angeles, CA (US)

(73) Assignee: FOX BROADCASTING COMPANY, LLC, Los Angeles, CA (US)

(*) Notice: Subject to any disclaimer, the term of this patent is extended or adjusted under 35 U.S.C. 154(b) by 422 days.

(21) Appl. No.: 15/110,934

(22) PCT Filed: Jan. 12, 2015

(86) PCT No.: PCT/US2015/011055
§ 371 (c)(1),
(2) Date: Jul. 11, 2016

(87) PCT Pub. No.: WO2015/106216
PCT Pub. Date: Jul. 16, 2015

(65) Prior Publication Data
US 2016/0352618 A1    Dec. 1, 2016

Related U.S. Application Data

(60) Provisional application No. 61/926,183, filed on Jan. 10, 2014.

(51) Int. Cl.
*H04L 12/707* (2013.01)
*H04L 12/721* (2013.01)
*H04L 12/741* (2013.01)

(52) U.S. Cl.
CPC .............. *H04L 45/22* (2013.01); *H04L 45/38* (2013.01); *H04L 45/74* (2013.01); *H04L 45/54* (2013.01)

(58) Field of Classification Search
CPC ....... H04L 45/123; H04L 45/22; H04L 45/38; H04L 45/44; H04L 45/54; H04L 45/70; H04L 45/74; H04L 47/34
See application file for complete search history.

(56) References Cited

U.S. PATENT DOCUMENTS 5,805,602 A    9/1998 Cloutier et al.
6,037,932 A *  3/2000 Feinleib .................. H04N 7/088
                                              348/478

(Continued)

OTHER PUBLICATIONS

International Search Report and Written Opinion dated May 1, 2015 for PCT App. No. PCT/US2015/11055.

(Continued)

*Primary Examiner* — Khoa Huynh
(74) *Attorney, Agent, or Firm* — Gates & Cooper LLP

(57) ABSTRACT

A method and system is provided for re-routing a flow of packets in a packet-switched network at a rerouting time. In one embodiment, the method comprises accepting packets in a switch, routing the flow of the packets to a first destination via the switch according to a switch flow rule, receiving an updated switch flow rule from a controller before the rerouting time, the updated switch flow rule defining the rerouted flow of packets, and rerouting the flow of packets according to the updated switch flow rule at a rerouting time indicated by a packet of the accepted packets.

40 Claims, 8 Drawing Sheets

(56) References Cited

U.S. PATENT DOCUMENTS

| | | | |
|---|---|---|---|
| 6,370,112 | B1 | 4/2002 | Voelker |
| 7,483,421 | B2 | 1/2009 | Compton |
| 7,706,353 | B2 | 4/2010 | Roy |
| 8,351,429 | B2 | 1/2013 | Assarpour |
| 8,566,920 | B2 | 10/2013 | Ylonen et al. |
| 2011/0182294 | A1* | 7/2011 | Lee .................. H04L 47/34 370/394 |
| 2013/0003741 | A1* | 1/2013 | Singh ................ H04L 45/123 370/394 |
| 2013/0058348 | A1 | 3/2013 | Koponen et al. |
| 2013/0242745 | A1 | 9/2013 | Umezuki |

OTHER PUBLICATIONS

International Preliminary Report on Patentability dated Feb. 1, 2016 for PCT App. No. PCT/US2015/11055.

SMPTE Recommended Practice, "Definition of Vertical Interval Switching Point for Synchronous Video Switching", Jul. 2009, pp. 1-23.

"Software-Defined Networking: The New Norm for Networks", Open Networking Foundation, ONF White Paper Apr. 13, 2012, pp. 1-12.

Bilberry, J., et al., "Network Service Security Through Software-Defined Networking", 2013.

"OpenFlow Switch Specification", Version 1.1.0 Implemented ( Wire Protocol 0x02 ), Feb. 28, 2011, pp. 1-56.

Laabs, M., "SDI over IP—seamless signal switching in SMPTE 2022-6 and a novel multicast routing concept", EBU Technical Review—2012 Q4, pp. 1-7.

Edwards, T., "Source Timed SDN Packetized Video Switching—Description of Technology & Proof of Concept", Nov. 14, 2014, pp. 1-6.

SMPTE Standard, "Transport of High Bit Rate Media Signals over IP Networks (HBRMT)", Oct. 2012, pp. 1-16.

Edwards, T., et al., "Video Processing in an FPGA-enabled Ethernet Switch", Written for presentation at the SMPTE 2013 Annual Technical Conference & Exhibition, 2013, pp. 1-10.

* cited by examiner

METHOD AND APPARATUS FOR PRECISELY SOURCE-TIMED NETWORK FLOW SWITCHING

CROSS-REFERENCE TO RELATED APPLICATIONS

This application is a National Stage of International Application No. PCT/US15/11055, entitled "METHOD AND APPARATUS FOR PRECISELY SOURCE-TIMED NETWORK FLOW SWITCHING," by Thomas G. Edwards, filed Jan. 12, 2015, which application claims benefit of the following U.S. Provisional Patent Application:

U.S. Provisional Patent Application No. 61/926,183, entitled "METHOD AND APPARATUS FOR PRECISELY SOURCE-TIMED NETWORK FLOW SWITCHING," by Thomas G. Edwards, filed Jan. 10, 2014;

all of which applications are hereby incorporated herein.

BACKGROUND OF THE INVENTION

1. Field of the Invention

The present invention relates to systems and methods for transmitting data and in particular to a method and apparatus for switching flow paths in packet switched networks at precise times.

2. Description of the Related Art

Some data flows require reception of entire atomic data elements on a regular temporal schedule for proper utilization of the data. One example is uncompressed digital video, which has the atomic unit of a frame of video. When video flows are changed, they must be changed on the boundary of a frame, rather than during the active video within it to avoid undesirable visible artifacts. Also a video flow requires frames to be regularly delivered by the precise times of frame visual presentation. If a frame is not delivered on time, it must be dropped, also leading to undesirable visible artifacts.

When these data flows with required regularly scheduled atomic data elements are transmitted on a packet switched network, changing the path of these flows through the network can lead to two problems.

The first problem is the potential of a destination not fully receiving a required atomic data element during the flow path change. For example, one could attempt to use Internet Group Management Protocol (IGMP) to manage the delivery of multicast Internet Protocol (IP) data flows. The destination could emit an IGMP Leave Group message to leave the multicast group that receives data transmitted from one data source, and then send an IGMP Membership Report message to join the group that receives data transmitted from another data source. Depending on the behavior of the network elements and the timing of the two IGMP messages, the destination may experience an instance during the flow path change when an atomic data element does not arrive in full during the required regular period. IGMP has no guarantees of the time it takes to make requested multicast flow path changes, and the actual timing will differ by vendor, network configuration, and potentially network load.

The second problem is the potential of double bandwidth during the flow path change. In the IGMP example, the destination may begin receiving data from the new source while still receiving data from the old source, resulting in a double bandwidth requirement. Indeed, an application may seek to emit an IGMP Membership Report message to join the new group before sending an IGMP Leave Group message to leave the old group in order to ensure that there are no regular periods without receiving data. This double bandwidth requirement means that the network paths between sources and destinations needs to be capable of double the bandwidth of the flows in order to ensure that the network paths are not oversubscribed (a situation that could lead to loss of data). This can be quite a waste of network resources, as that extra bandwidth required during flow path changes is not required most of the time when the system is not changing flow paths.

Existing solutions to avoid the "double bandwidth" problem require specialized processing outside of the typical Ethernet switch hardware. If flow path changes can be made at the precise times between regular atomic elements, destination devices could be assured of uninterrupted data delivery without the network needing to be scaled for a double bandwidth requirement. However, traditional means of making such flow path changes cannot be made quickly or at precise times between regular atomic elements. Packet switched networks generally use switching devices which are designed for the high-speed switching of packets based on rules in a forwarding information base (FIB). FIB rule changes on packet switching devices are much slower than the speed that device can switch individual packets. For example, see Curtis, et al., "DevoFlow: scaling flow management for high-performance networks", Proceedings of the ACM SIGCOMM 2011 conference, pp. 254-265 ACM New York, N.Y., USA, doi>10.1145/2018436.2018466 (describes typical FIB rule update times, "We found that the switch {ProCurve 5406zl} completes roughly 275 flow setups per second"), and Bilberry, et al., "Network Service Security Through Software-Defined Networking", (describes FIB rule update times, "on Arista 7050S switch meeting OpenFlow 1.0 specification . . . Mean time to install a flow is 5.2 ms {192/second}, standard deviation of 3.4 ms over 250 tests. Flow updates took as little as 0.76 ms {1315/second} and as long as 15 ms {66/second}"), both of which are hereby incorporated by reference herein.

So despite the fact that data plane of some packet switches available today can switch over 1 billion packets per second, FIB rule updates run at much slower speeds, often 1000 or fewer rule updates per second. Furthermore, packet switching devices in common use today do not have a way to accurately time the instantiation of a new FIB rule. This makes it difficult to make FIB rule changes at precise times between regular atomic elements of high speed data flows.

Accordingly, there is a need for a system and method that allows flow path changes to be made at precise times between regular atomic elements without double bandwidth scaling. The present invention satisfies that need.

SUMMARY OF THE INVENTION

To address the requirements described above, a method, apparatus, article of manufacture, and a memory structure for achieving the precisely timed changes of data flow paths in a packet switched network that will work with many packet switches commonly available in the marketplace is disclosed herein.

In one embodiment, the method comprises accepting packets in a switch, routing the flow of the packets to a first destination via the switch according to a switch flow rule, receiving an updated switch flow rule from a controller before the rerouting time, the updated switch flow rule defining the rerouted flow of packets, and rerouting the flow of packets according to the updated switch flow rule at a rerouting time indicated by a packet of the accepted packets. These features may also be manifested by a packet switching system comprising a switch having one or more input ports for accepting the packets, one or more output ports for providing the packets to a destination, and a processor communicatively coupled to the input ports and the output ports and to a memory storing instructions for performing the foregoing operations.

In another embodiment, the method comprises establishing a rerouting flow control rule on one or more packet switching devices before the rerouting time, the rerouting flow control rule defining the rerouted flow path of the data packets and signaling the rerouting of the flow path of data packets according to a header of one of the packets.

From a controller embodiment perspective, the method may comprise transmitting a switch routing rule to a switch receiving the flow of packets from the source, the switch routing rule describing an routing of the flow of packets and having a first index, transmitting an updated switch routing rule describing the rerouting of the flow of packets to the source before the rerouting time, the switch routing rule having a second index, and transmitting the second index to the source, the second index for inclusion in the flow of packets at the rerouting time.

From a source embodiment perspective, the method may comprise transmitting the flow of packets, each packet having an index, to a switch prior to a rerouting time, according to a source routing rule having the first index, receiving an updated source routing rule from a controller, the updated source routing rule having a second index, and transmitting the rerouted flow of packets, each packets having the second index, to the switch at the rerouting time according to the updated source routing rule.

Finally, these features may also be manifested by a system comprising a switch and a controller communicatively coupled to the switch, wherein the switch comprise a plurality of ports for receiving the flow of packets from at least one source and routing the received packets among the plurality of ports according to a switch routing rule at a time identified by an index in a packet of the flow of packets when the packet having the index is received in the switch, and the controller generates the switch routing rule identified by the index and providing the switch routing rule and index to the switch prior to the rerouting time and provides the index to a source of the flow of packets.

BRIEF DESCRIPTION OF THE DRAWINGS

Referring now to the drawings in which like reference numbers represent corresponding parts throughout.

DETAILED DESCRIPTION OF PREFERRED EMBODIMENTS

Figure 1:
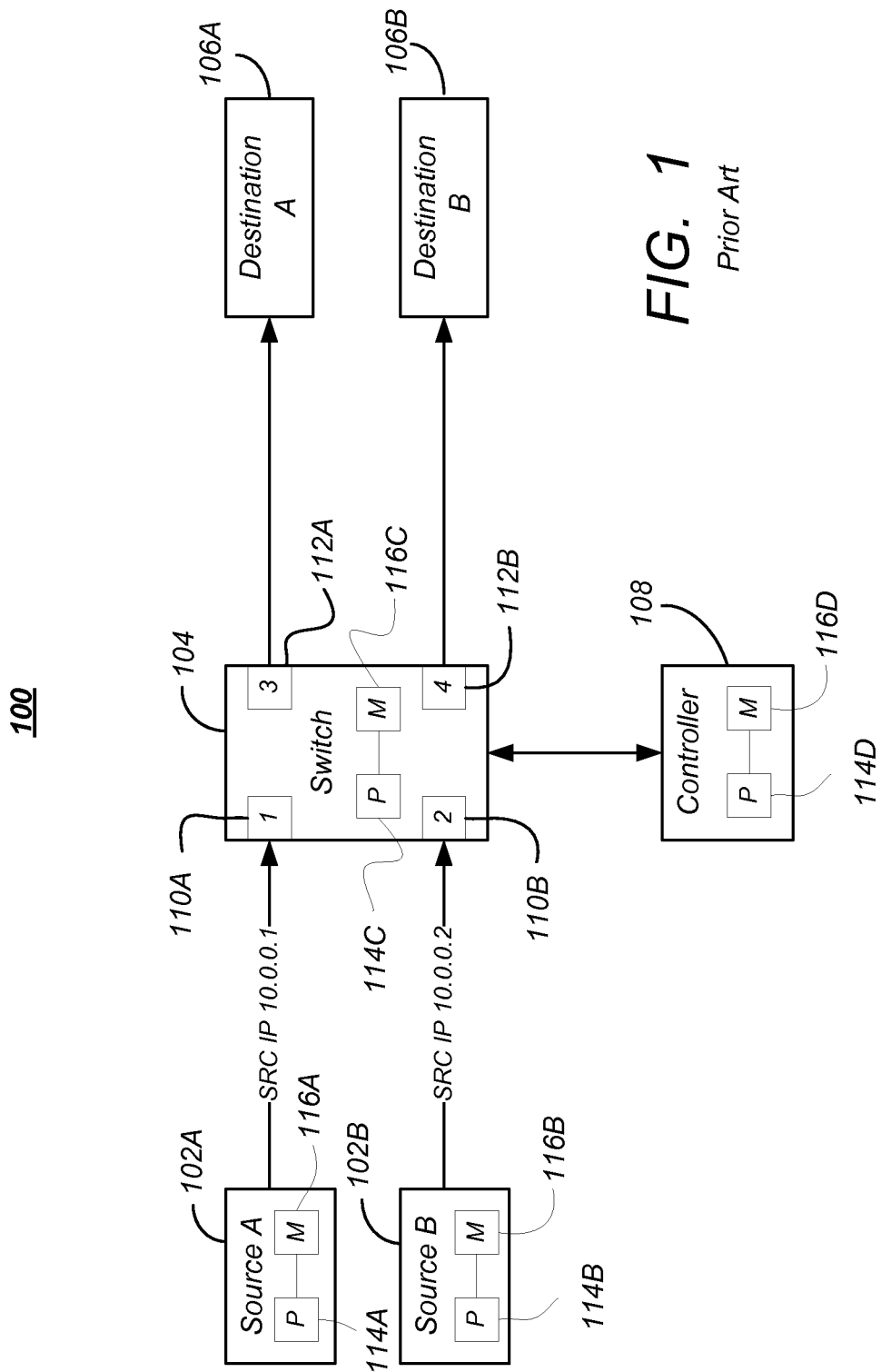
FIG. 1 is a diagram showing a top level hardware environment an illustrated example of source-timed packetized video switching.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The precise flow switch timing described above is achieved by separating the flow rule changes themselves from the timing signal to enact the changed flow rules. This permits the flow rule change to be established at a slower pace before the precise time of the flow path change. Then, at the precise time of the flow path change, the data source enacts a change (i.e. in the packet headers) that is used to activate the changed rules. Since the data source has an intimate knowledge of the data flow, and is thus well placed to know when to change the packet headers to activate the flow path change.

A central controller may establish new flow rules on network devices, and then inform data flow sources that they should change their packet header field at the next available boundary between atomic data elements in order to enact the data flow path change. Establishing new flow rules may be performed in a number of different ways. Many packet switching network elements have the capability for some kind of programmable changes to access control lists (ACLs) that filter network input or output on ports or VLANs. Software Defined Networking (SDN) also offers the potential for very fine-grained control of FIB rules via standard interfaces such as OPENFLOW. OPENFLOW is described in "OpenFlow: Enabling Innovation in Campus Networks," by Nick McKeown et al., published Mar. 14, 2008, which is hereby incorporated by reference herein. The OPENFLOW switch specification is described in "Open-Flow Switch Specification, Version 1.3.3 Implemented (Protocol Version 0x04))," by the Open Networking Foundation, published Sep. 27, 2013, which is hereby incorporated by reference herein. Other means for establishing FIB rule changes on network elements can also be used.

Video data typically comprises a plurality of packets, with each packet having a header. A value of one of the fields of the packet header may be used to signal the timing for changing from one flow rule to another. In one embodiment, the packet header value represents a serial number of a flow routing table, which is incremented every time the table is changed. Alternatively, the packet header value could represent a numbered step in a series of pre-established flow path changes (for different acts of a television program, for instance). The source device may also use the packet header to represent a time-related value, such as all or part of an IEEE 1588 Precision Time Protocol (PTP) time code, video frame count, or other parameter. The IEEE 1588 PTP is defined in "IEEE Standard for a Precision Clock Synchronization Protocol for Networked Measurement and Control Systems," IEEE STD 1588-2008 (Revision of IEEE STD 1588-2002), vol., no., pp. c1, 269, Jul. 24, 2008, which is hereby incorporated by reference herein.

This time-related value can be used to key into timed data flow rules changes on the network elements, especially if "greater than" or other appropriate wildcard rules could be set in the FIB.

Typically, the packet header includes multiple fields, and preferably, the field chosen to implement the indication or signaling of flow path changes does not affect networking or data flow processing in an undesired way. Any packet header field may be chosen depending on network design and flow processing rules. For user datagram protocol (UDP) data flows, the UDP source port (16 bits) is one natural choice, as it is generally of little use in networking or data processing.

Since the FIB typically has a limited amount of memory, removing old rules may be required to free up memory storage so that new rules can be added to implement future data flow changes. For network elements that use SDN based on the OPENFLOW application programming interface (API), old rules that are no longer being used may automatically time-out and be removed from the FIB.

OPENFLOW is described in "Software-Defined Networking: The New Norm for Networks," by the Open Networking Foundation, published Apr. 13, 2012, which is hereby incorporated by reference herein. OPENFLOW has two time out mechanisms that may be used to implement the deletion of old flow rules. A first mechanism (idle_timeout) removes a flow rule entry a specified number of seconds after the flow rule is no longer matched by packet headers. A second mechanism (hard_timeout) removes a flow rule entry at a specified number of seconds after being installed on the switch or other network element. A controller 104 installing flow rules on network elements may use these mechanisms for rule timeouts upon flow rule installation to eliminate obsolete flow rules to make room to store new flow rules. For network elements without automatic or native rule time out mechanisms, a controller may need to affirmatively command removal of the old rules from network elements when they are no longer required or before the FIB memory becomes full. In one embodiment, the FIB memory may be implemented with a first-in-first-out (FIFO) storage paradigm, wherein storage of a new flow rule automatically results in the deletion of the oldest flow rule currently stored in the FIB memory.

The techniques disclosed herein allow packetized video flows to be switched without visible artifacts or "glitching." It assumes a broadcast plant where all packetized video streams are emitted from sources in a synchronized fashion (for instance, through the use of IEEE 1588 Precision Time Protocol), and assumes networking devices utilize control via software defined networking (SDN), such as the OPENFLOW protocol.

Data sources such as video devices emitting packetized video data are assumed to have their packets sent to video receiving devices through Ethernet switches with flow tables programmed via SDN mechanisms. Previous to the desired time to switch a video stream from an input port to a different output port, new rules are added to the flow tables representing the desired post-switch video flow, and slight changes in the packet header fields that are not yet being transmitted by the video sources are made to signal the timing for implementing the new rules in the flow tables. Preferably, these header differences do not negatively affect other required networking & processing. UDP source ports are a good candidate for such changes.

The data source must be aware of when it is emitting packets in a valid video switching point in the raster (such as the switching area defined in "Definition of Vertical Interval Switching Point for Synchronous Video Switching RP-168-2009, published 2009 by the Society of Motion Picture and Television Engineers (SMPTE), hereby incorporated by reference herein). To perform a clean video switch, during the time the data source or video emitter is emitting packets from a valid video switching point, the video emitter makes those slight changes in its output packet headers that match the new rules added to the flow tables. This signals the switches to now process the video packets by the newly added rules, and thus there is a switch in video flows to different destinations through the Ethernet switches. Once new rules are being utilized, the old rules can be deleted from the SDN switches, potentially via idle_timeout setting on flow.

Hence, the foregoing allows for "clean" packetized video switching in a network without requiring receiver nodes to experience double the bandwidth of video during a "make-before-break" operation such as IGMP joining a new video stream before IGMP leaving the current video stream. It is also a method that is compatible with standard OPENFLOW SDN enabled switches, and does not require specialized hardware systems. Furthermore, this general concept can be used for any other application where precise timing of flow changes in SDN systems is required.

FIGS. 1-6 are diagrams showing an illustrated example of source timed packetized video switching. In this example, the video packets are routed as according to a first VRT and then precisely switched to be routed as described by a second VRT as signaled by a change in a header of one of the video packets.

FIG. 1 is a diagram showing an exemplary switching network such as a video switching network (VSN) 100 for performing source-timed switching of packetized data. The VSN 100 comprises a controller 108, and one or more switches 104 such as a Ethernet video switch having a plurality of ports. In the illustrated embodiment, four ports are illustrated, including input ports 110A and 110B (alternatively collectively referred to hereinafter as input ports 110) and output ports 112A and 112B (alternatively collectively referred to hereinafter as output ports 112). Also included is a first source of packetized video data (source A) 102A which has a source (SRC) IP address of 10.0.0.1, coupled to switch port 1 110A of switch 104 of the illustrated switching network 100, and a second source of packetized video data, (source B) 102B having an SRC IP address of 10.0.0.2 coupled to switch port 2 112B of the switch 104 of the illustrated switching network 110. Video information is to be routed to either destination A 106A on switch port 3 112A or destination B 106B on switch port 4 112B as commanded by the controller 108. Hence, source A 102A is communicatively coupled to input port 1 110A of switch 104, and source B 102B is communicatively coupled to input port 2 110B of switch 104. Further, output port 3 112A is communicatively coupled to destination A 106A and output port 4 112B is communicatively coupled to destination B 106B. Destination A 106A and destination B 106B be described herein as "sinks."

Controller 108 is communicatively coupled to the switch 104, to provide data and commands to the switch 104 that define which input port 110 is to be communicatively coupled to which output port 112, thereby allowing packetized video data to flow from one or more sources 102 to one or more destinations 106. Data may flow from a single source 102 to multiple destinations 106, or to one destination

106 from multiple sources 102. For example, a device attached to a single output port on the switch 1-04 may process multiple channels of video from a plurality of sources 102, with a different source or destination multicast IP address. Such data and commands issued by the controller 108 can include VRTs and software defined networking (SDN) switch flow tables, as further described below.

Sources 102, switch 104 and controller 108 each may include an associated processor 114A-114D, respectively and a memory 116A-116D communicatively coupled thereto. The processors may perform the operations described herein using instructions stored in the associated memory. Alternatively or in addition, some or all of the operations described bellow may be performed by dedicated electronics in the sources 102, switch 104 and controller 108. Although only one switch 104 is illustrated in the exemplary embodiment shown in FIG. 1, the switching network 100 may comprise any number of switches 104. Also, each switch can have any number of input ports 110 and output ports 112, and switch output ports 112 may be communicatively coupled to the input ports 114 of other switches.

Figure 2:
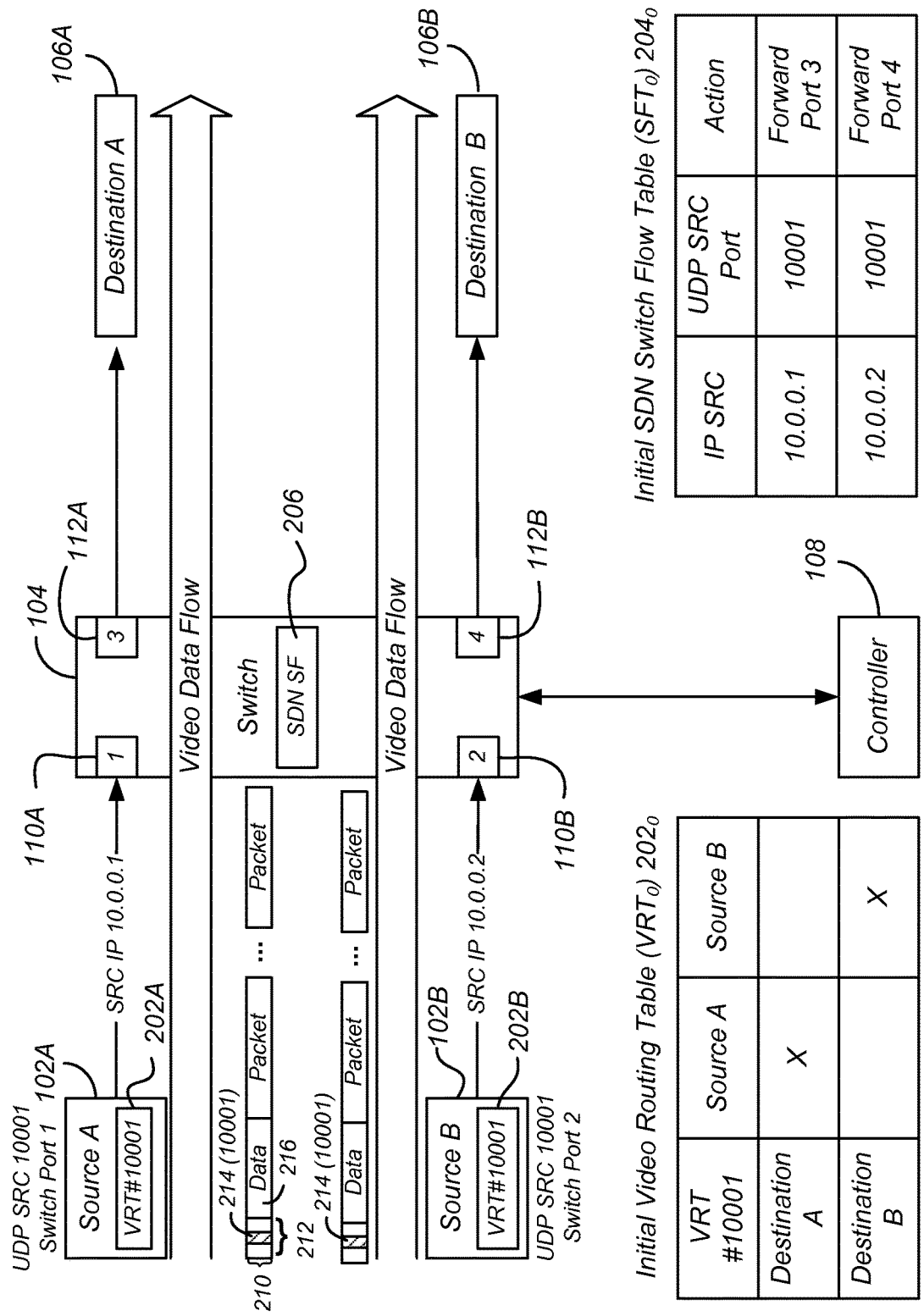
FIG. 2 is a diagram illustrating an initial system condition of the illustrated example of the source-timed packetized video switching.

FIG. 2 is a diagram illustrating an initial system condition of the illustrated example of source-timed packetized video switching. Initially, the routing is as described in an initial source routing rule described, for example, in a initial video routing table $VRT_0$ 202. The initial $VRT_0$ 202 has been provided from the controller 108 to the sources 102 at some time in the past, resulting in a first initial $VRT_0$ instance 202A stored in or accessible to source A 102A and a second initial $VRT_0$ instance 202B stored in or accessible to source B 102B. Changes to the routing are described in subsequent VRTs 202, (e.g. $VRT_i$ for i=1, 2, . . . n) each of which may be associated with an identifier or index such as a serial number. In the illustrated example, the initial $VRT_0$ 202 is referred to by a serial number (e.g. VRT #10001), and is used to indicate that the video packets from source A 102A should be routed to destination A 106A, and the video packets from source B 102B should be routed to destination B 106B, as illustrated.

Similarly, an switch flow rule described, for example, by SDN switch flow (SF) table 204 is initially provided to the switch 104 and stored in switch memory 206. The exemplary SDN SF table 204 defines the switch flow between the input ports 110 and output ports 112 of the switch 104. The illustrated SDN switch flow table 204 shows a switch flow in which the IP SRC 10.0.0.1 is forwarded to output port 3 112A, while packets sourced from IP SRC 10.0.0.2 are forwarded to output port 4 112B.

The UDP describes the notion of ports that use datagram sockets to establish communications. Applications bind datagram sockets to the endpoint (e.g. the sink) of the data transmission. Ports are software structures that are identified by a port number, typically between 0 and 65535. An UDP SRC port can used as an "inconsequential header" to signal which VRT 202 and SDN SF 204 version should be used to route the data. In the illustrated example, VRT #10001 (illustrated in the figure) is specified. This results in the video flow illustrated in FIG. 2, with the video from source A 102A being routed to destination A 106A and the video from source B 102B being routed to destination B 106B.

FIG. 2 also illustrates an exemplary structure of the data packets 210. Each packet 210 comprises a header portion 212 and a payload or data portion 216. The header 212 comprises a field 214. In one embodiment, the field includes data such as an index uniquely associated with the initial $VRT$ $202_0$ and the initial SDN switch table $204_0$. As further discussed below, this index and its association with the Switch Flow Table of the desired packet flow can be used to precisely signal when the packets are to be rerouted by the switch 104. The index may also be used to specify which Switch Flow Table should be used.

Figure 3:
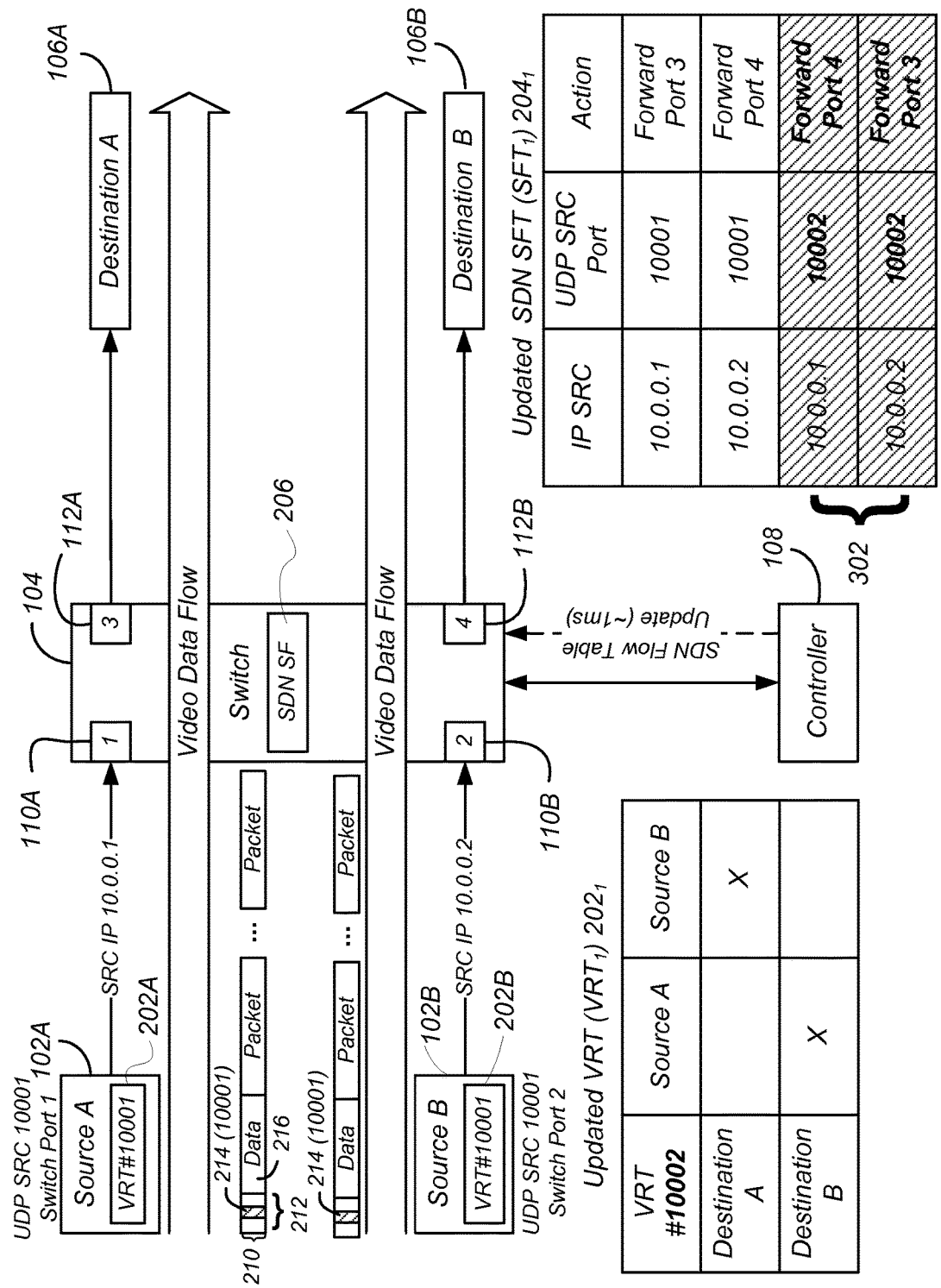
FIG. 3 is a diagram illustrating exemplary operations in response to a switching request made before the actual switching of video flow in the illustrated example of the source-timed packetized video switching.

FIG. 3 is a diagram illustrating exemplary operations in response to a switching request generated and transmitted temporally before the desired switch of the video flow in the above-illustrated example. The initial switch flow table $204_0$ is updated to add entries defining the desired new data flow, thus generating an updated switch flow table $204_1$. The controller 108 sends the updated switch flow table $204_1$ to the one or more switches 104. Alternatively, the controller 108 may send only updates 302 to the flow table to the one or more switches 104, allowing the switches 104 to internally update the flow table stored therein. The controller updated switch flow table $204_1$ is sent a period of time before the desired switch in the flow of video data is to take place. Since switch flow table updates can be established (received and stored) in about 1 millisecond, the updated switch flow table $204_1$ (or switch flow table updates) are transmitted 1 millisecond or more before the desired switch in the video flow is to take place. The updated or new switch flow table $204_1$ includes the UDP SRC Port. In the illustrated embodiment, the updated entries to the switch flow table are associated with VRT #10002 as specified at the UDP SRC port, and specifies the forwarding of the data from IP SRC 10.0.0.1 (provided to input port 110A) to output port 4 106B and from IP SRC 10.0.0.2 (provided to input port 110B) to output port 3 106A. The UDP SRC Port entries (e.g. 10002) can be used as an index to the switch flow table and the source flow table (VRT), and can be used to signal when the switch 104 should begin routing the data packets 210 using the updated switch flow table $204_1$.

Figure 4:
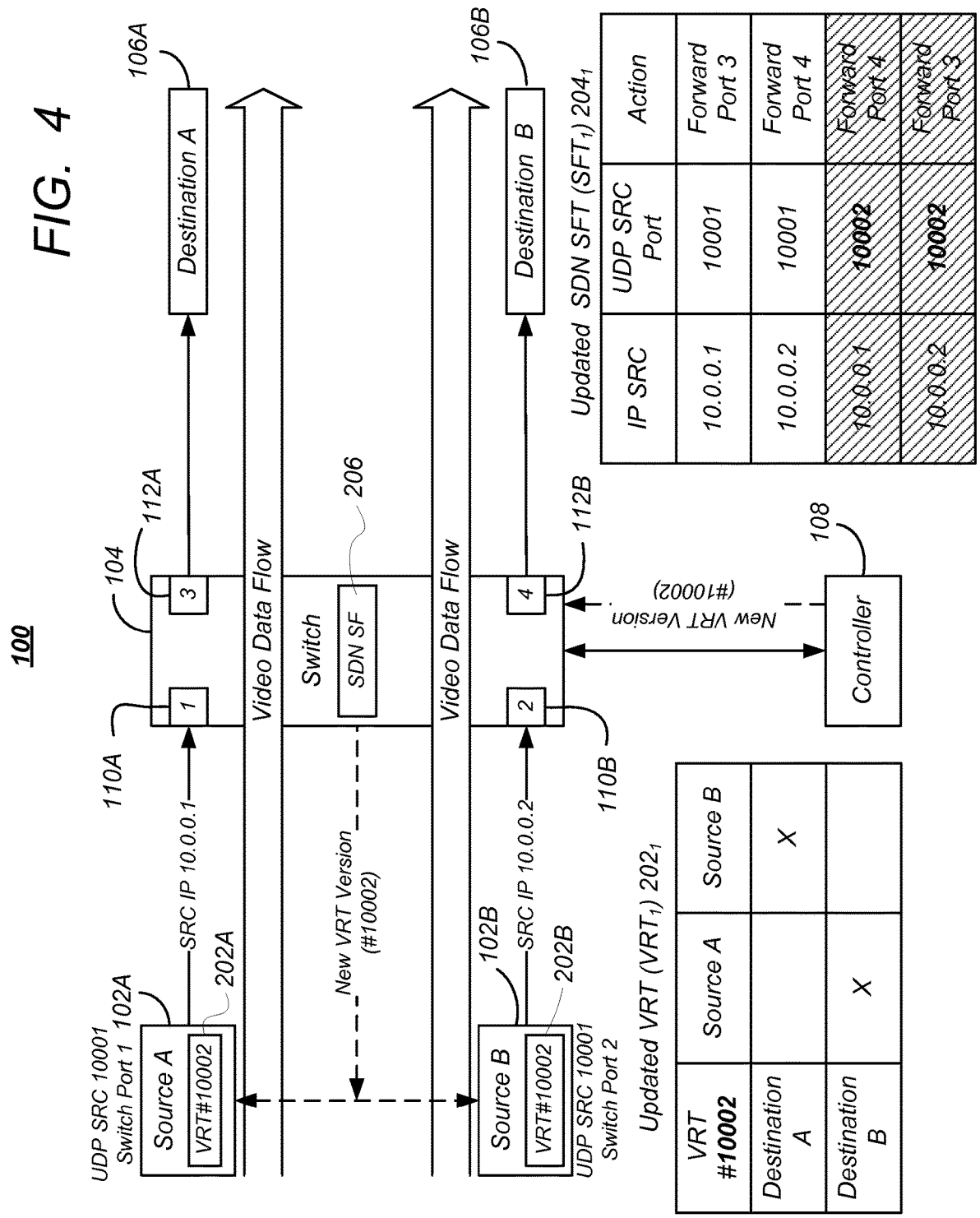
FIG. 4 is a diagram illustrating exemplary operations to update the source video routing table (VRT) via an SDN switch flow table.

FIG. 4 is a diagram illustrating exemplary operations to update the source video routing table (VRT) 202 via an SDN switch flow table. The controller 108 sends the new VRT version (#10002) $VRT_1$ $202_1$ to video source A 102A and source B 102B. Typically, this is accomplished by sending the VRT through the switch 104. The new VRT version indicates the new video routing scheme to be imposed at the appropriate time, which may be selected by either the video sources 102 or the controller 108. At this point, the SDN switch flow table $204_1$ may includes entries for both the previous $VRT_0$ and the updated $VRT_1$ as shown in FIG. 4.

In one embodiment, the controller transmits the updated or new source video routing table $VRT_1$ to the sources 102 before the change in video routing is to occur, and the flow switch itself is signaled later, by the video sources 102 in response to a command message from the controller 108, or by the video sources 102 using knowledge of the location of the video raster. For example, the sources 102 may signal the flow switch to occur at the beginning of a vertical blanking interval, as further discussed below. Alternatively, the controller may transmit the update or new source video routing table $VRT_1$ to the sources 102 when the flow switch is to occur.

Figure 5:
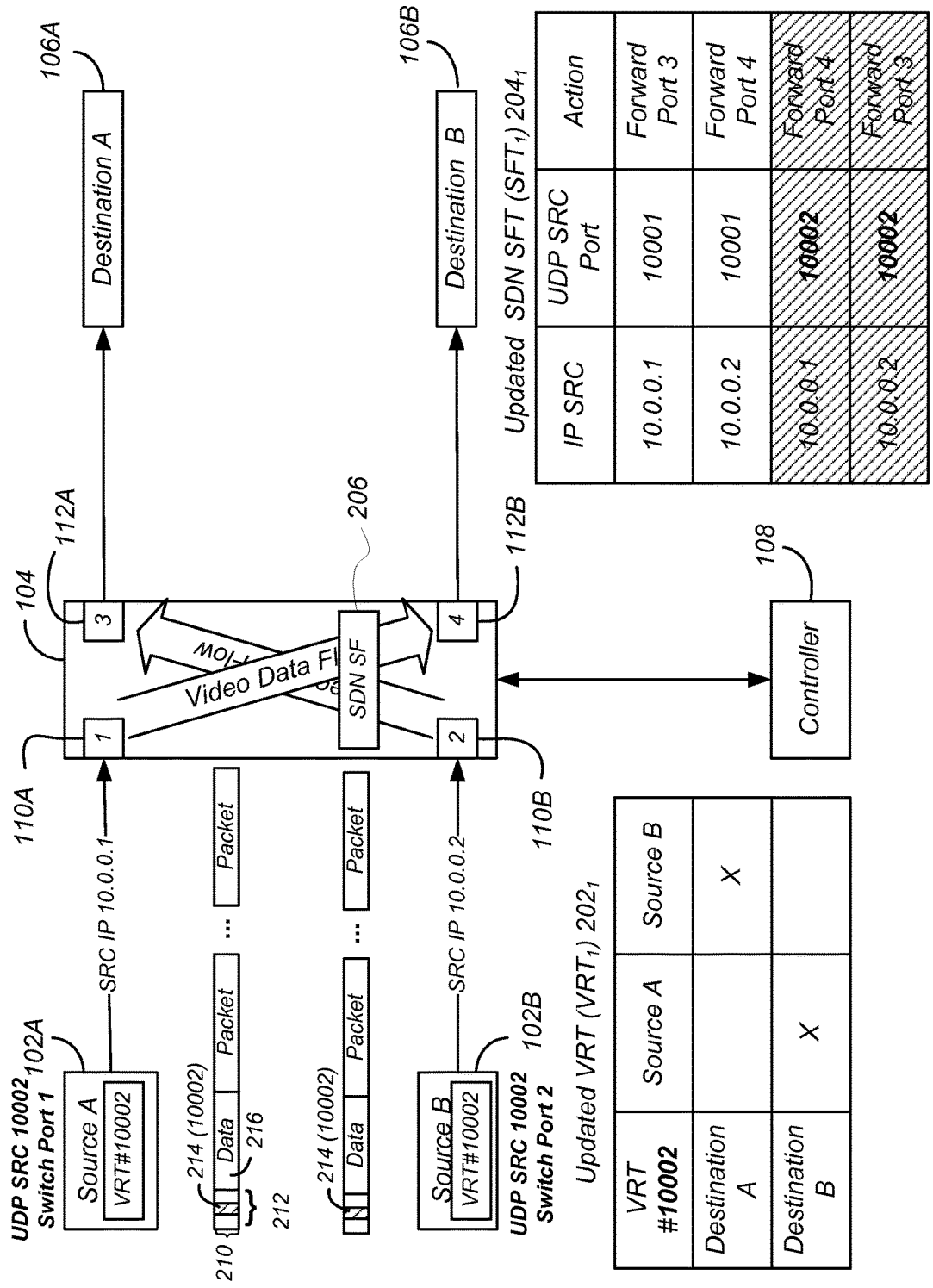
FIG. 5 is a diagram illustrating exemplary operations to switch video sources according to the updated VRT.

FIG. 5 is a diagram illustrating exemplary operations to switch video sources according to the updated $VRT_1$. At the appropriate time, source A 102A and source B 102B switch to the $VRT_1$ that was previously updated (e.g. VRT #10002). The timing of the flow switch itself can be precisely signaled by the sources 102 to the switch 104 using a data value such as an index that may be conveyed in portion of a video packet 210 (e.g. a flag, or portion of a field 214 of a header 212).

In one embodiment, the data value comprises an index such as the UDP SRC port number described above. For example, as illustrated in FIG. 5, the video source 102 may insert the UDP SRC port number of #10002 within a field 214 of the header 212 of the data packet, as shown in FIG. 5. Since previous packets included the UDP SRC port number of #10001, the switch 104 can inspect the fields 214 of the incoming packet headers 210 interpret the change in this field value as a signal to route this packet and further data packets according to the updated switch flow table $204_1$ rather than the initial switch flow table $204_0$. Although not necessary, the switch may also use the field value to determine which of the pre-stored switch flow tables 204 to begin to use with the incoming packet. For example, the switch 104 may store a switch flow table having entries for UDP SRC Port values of 10001, 10002, and 10003. Incoming packets may be switched from a first flow rule associated with the UDP SRC Port value of 10001 to a second flow rule associated with the UDP SRC Port value of 10003 (instead of the next sequential UDP SRC Port value of 10002), by simply using the flow rule identified by the incoming packet.

In one embodiment, the switch of the data packet routing is timed to occur during the vertical interval (VBI) switching point defined in SMPTE RP 168. This can be accomplished by the sources 102, as the sources 102 are aware of the transmitted packets' location in the video raster. The VBI is a convenient place to perform switching because it includes no image data and the switch will not be perceived by viewers when the packets are decoded. Since the sources 102 know the location of the video raster at any particular time, the video switch timing is precise, synchronized, and glitchless.

Figure 6:
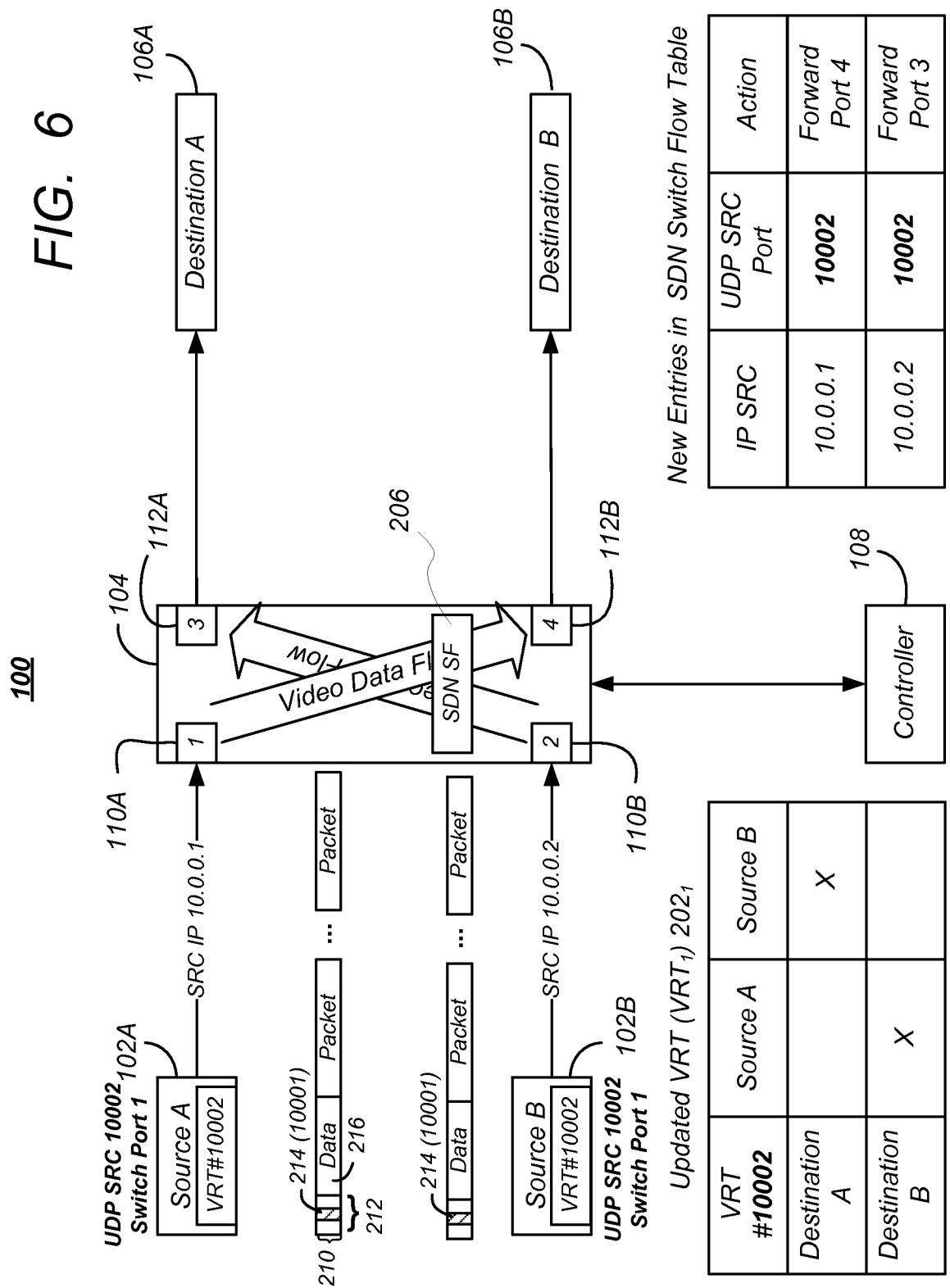
FIG. 6 is a diagram illustrating the timeout of old routing rules.

FIG. 6 is a diagram illustrating how timeout rules can be used to delete outdated routing rules from the SDN switch flow tables. As described above, such timeout rules include an idle_timeout and a hard_timeout.

The idle_timeout removes a flow rule entry a specified number of seconds after the flow rule is no longer matched by the packet headers. For example, the first two entries in the SDN switch flow table $204_1$ illustrated in FIG. 5 are associated with the UDP SRC Port 10001. A field of the packet headers from both source A 102A and source B 102B at one time included the UDP SRC port value of 10001, but the value of the field for packets temporally occurring after the video switch have a UDP SRC port value of 10002 (indeed, the change in the UDP SRC Port value may have been used to signal the new VRT $202_1$ and when the switch to the new VRT $202_1$ should occur). When the field of the packet header comprise only UDP SRC port values of 10002, it can be ascertained that the SDN switch flow table 204-1 entries associated with the UDP SRC port values of 10001 are stale and should be deleted. This may be implemented by setting the OPENFLOW idle_timeout field of the flow_mod message to a particular value, specifying the idle time (the time after the SDN flow rule is no longer matched, as no packets matching the old UDP SRC port value will be transmitted) after which the SDN switch flow table entries are deleted.

Also as described above, the OPENFLOW timeout rules also include a hard timeout. The hard_timeout removes a flow rule entry a specified time period after being installed on the switch 104 or other network element. The hard time is likewise included in a flow_mod message.

Figure 7:
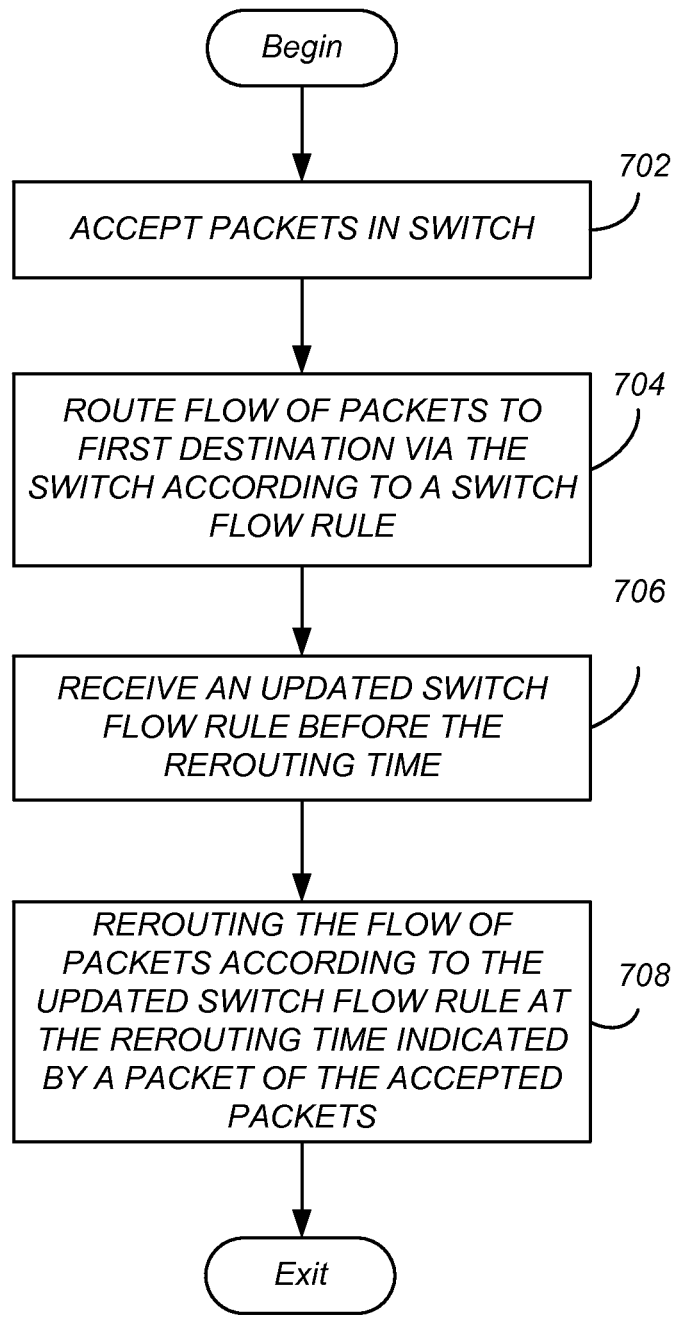
FIG. 7 is a flow chart illustrating exemplary process steps that can be used to implement precisely timed packet switching.

FIG. 7 is a diagram illustrating exemplary operations that can be used to implement precisely timed packet flow rerouting as described above. In block 702, packets 210 are accepted in a switch 104. In block 704, the flow of packets 210 is routed to a first destination (e.g. 106A) via the switch 104 according to a switch flow rule. As described above, the switch flow rule used to route the accepted packets 210 may be expressed in a switch flow table 204 received from a controller 108 and stored either in switch memory 116C, in dedicated memory 206, or in another element of the switching network 100 available to the switch 104.

In block 706, an updated switch flow rule is received in the switch 104 before the rerouting time, and stored. The updated switch flow rule may be expressed as an updated switch flow table 204, again received from the controller 108. The advance timing of the reception of the switch flow table 204 is selected to provide the switch 104 adequate time to receive and store the switch flow table for later substantially instantaneous use when signaled. For example, typical Ethernet video switches 104 require approximately 1 millisecond to receive, store, and become prepared to respond to routing changes signaled in the packets, so the switch flow table 2-4 should be received by the switch 104 at least 1 millisecond in advance.

In block 708, the flow of packets is rerouted according to the updated switch flow rule at the rerouting time as indicated by at least one of the packets accepted by the switch.

As described above, the rerouting time may be indicated by the at least one of the packets by inserting a value in a field 214 of the header 212 of the subject packet 210. In one embodiment, this value may be read by the switch 104, and compared to another value (such as the value of a clock global to the switching network 100) to determine if the flow of packets is to be routed by the updated switch flow table 204.

In another embodiment, the value in the field 214 may be compared to another value in the field 214 of previously received packets 210 to determine when to apply the latest received switch flow table. For example, if the value of the field 214 in a first group of packets is 10001, the switch 104 can parse the packets 210 to find the temporally first packet having a different value than 10001. If the value of the field 214 in a second group of packets following the first group of packets is 10002, the switch 104 can implement the routing defined by the updated switch flow table beginning with the first packet having the field 214 value of 10002, since 10002 represents a change in the field's value from 10001. It is also possible to use the field value 214 to signal a change in the flow rule that is to begin on packets following the packet with the changed value. For instance, a change in the value from 10001 to 10002 may signal that the next packet or other designated following packet, rather than the first packet having the value 10002, be the first packet upon which the updated flow table is applied. It is also possible to use the field to not only signal the timing of the switch flow rule to be implemented, but also to identify the switch flow rule itself. For example, in the embodiment illustrated in FIGS. 2-6 the initial switch flow table entries were indexed to the UDP SRC Port value of 10001, and the updated switch flow table entries 302 were indexed to the UDP SRC Port value of 10002. If the switch 104 included adequate memory to store additional flow table entries, a UDP SRC Port value of 10003 may be used as an index to additional flow table entries (e.g. with the output from source A 102A routed to both destination A 106A and destination B 106B). In this case, the source may signal both the timing and identity of the desired flow rule by changing the value of the packet fields 214 from 10001 to 10003. Information regarding which of the flow rules have been provided to the switch 104 may be made available to the sources 102 by transmitting source routing rules (described, for example, by the video routing tables 202 described above), with each video routing table having an index that is either matches or is mappable to the index used for the switch flow table. For example, FIGS. 3-6 illustrate that the flow rule index 10001 is included in switch flow table 204 and the video routing table 202. Since the sources 102 receive a source routing rule (described in the VRT 202) that includes the same index used to identify the switch routing rule (described in the switch flow table 204), the source 102A can not only control the timing of the flow rule changes, but which flow rule itself is selected. In other embodiments, the sources 102 select a different source rule immediately upon receipt of an updated VRT 202 from the controller 108. In this embodiment, the controller 108 effectively commands the source of the flow of packets 210 to insert the indication of the changed flow rule into the packets transmitted to the switch 104.

Hardware Environment

Figure 8:
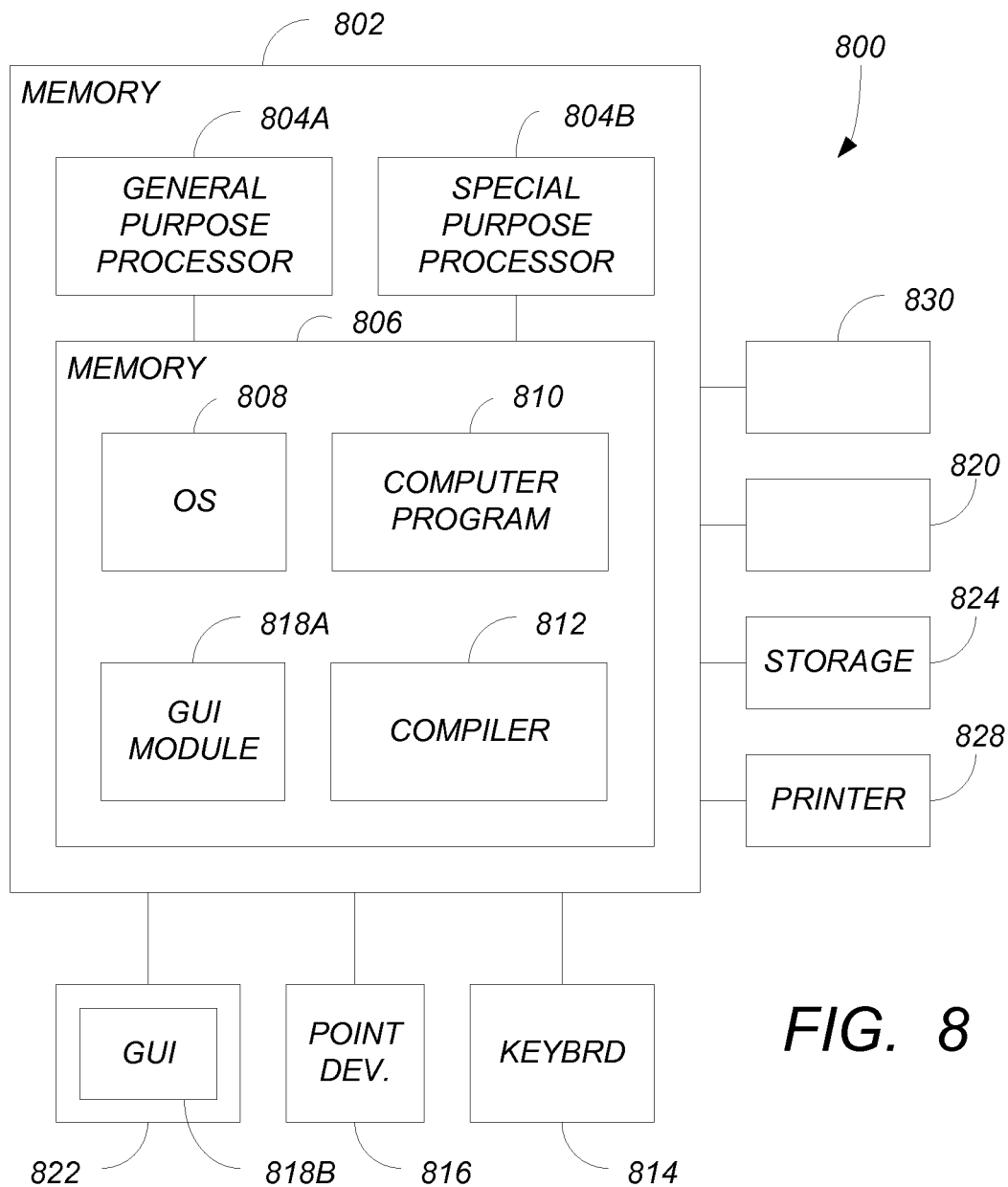
FIG. 8 is a diagram illustrating an exemplary computer system that could be used to implement elements of the present invention.

FIG. 8 is a diagram illustrating an exemplary computer system 800 that could be used to implement elements of the present invention including the processors 114A-114D and associated memories 116A-116D of the switch network 100. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to other devices, including input/output (I/O) devices such as a keyboard 814, a mouse device 816 and a printer 828.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808 to provide output and results.

Output/results may be presented on the display 822 or provided to another device for presentation or further processing or action. In one embodiment, the display 822 comprises a liquid crystal display (LCD) having a plurality of separately addressable pixels formed by liquid crystals. Each pixel of the display 822 changes to an opaque or translucent state to form a part of the image on the display in response to the data or information generated by the processor 804 from the application of the instructions of the computer program 810 and/or operating system 808 to the input and commands. Other display 822 types also include picture elements that change state in order to create the image presented on the display 822. The image may be provided through a graphical user interface (GUI) module 818A. Although the GUI module 818A is depicted as a separate module, the instructions performing the GUI functions can be resident or distributed in the operating system 808, the computer program 810, or implemented with special purpose memory and processors.

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 802 may also implement a compiler 812 which allows an application program 810 written in a programming language such as COBOL, C++, FORTRAN, or other language to be translated into processor 804 readable code. After completion, the application or computer program 810 accesses and manipulates data accepted from I/O devices and stored in the memory 806 of the computer 802 using the relationships and logic that was generated using the compiler 812.

The computer 802 also optionally comprises an external communication device such as a modem, satellite link, Ethernet card, or other device for accepting input from and providing output to other computers.

In one embodiment, instructions implementing the operating system 808, the computer program 810, and/or the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, or a flash drive. Further, the operating system 808 and the computer program 810 are comprised of computer program instructions which, when accessed, read and executed by the computer 802, causes the computer 802 to perform the steps necessary to implement and/or use the present invention or to load the program of instructions into a memory, thus creating a special purpose data structure causing the computer to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 802.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of re-routing a flow of packets in a packet-switched network at a desired rerouting time, comprising:
accepting the flow of packets from a source in a switch;
routing the flow of the packets to a first destination via the switch according to a switch flow rule;
receiving an updated switch flow rule from a controller before the rerouting time, the updated switch flow rule defining the re-routing of the flow of packets; and
rerouting the flow of packets according to the updated switch flow rule at a rerouting time indicated by a packet of the accepted flow of packets;
wherein the rerouting time is synchronized by a controller commanding the source to change the packet in the flow of packets at the desired rerouting time.

2. The method of claim 1, wherein each packet in the flow of packets comprises a header including a field having a value indicating the rerouting time.

3. The method of claim 2, wherein the rerouting time is determined from a comparison between the value and a clock value.

4. The method of claim 2, wherein the rerouting time is determined from a change in the value of the field of the packet from a value of the field of another packet temporally preceding the packet in the flow of packets.

5. The method of claim 4, wherein the value of the field of the flow of packets comprises an index value.

6. The method of claim 5, wherein the index value is a serial index value.

7. The method of claim 5, wherein:
the index value of the packet of the accepted and unrerouted flow of packets matches an index value of a first source routing rule transmitted to a first source from the controller before accepting the flow of packets from the first source in the switch; and
the index value of the another packet of the rerouted flow of packets matches an index value of a second source routing rule transmitted to the first source.

8. The method of claim 7, wherein the second source routing rule having the index is transmitted to the first source at the rerouting time to initiate the rerouting of the flow of packets.

9. The method of claim 8, wherein:
the index value of the first source routing rule matches an index value of the first switch routing rule; and
the index value of the second source routing rule matches an index value of the second switch routing rule.

10. The method of claim 9, wherein the index value comprises a user datagram protocol (UDP) source port.

11. The method of claim 1, further comprising receiving a confirmation that the updated switch flow rule has been received and established in the switch.

12. The method of claim 1, wherein the flow of packets includes a vertical blanking interval, and the rerouting time is during the vertical blanking interval.

13. The method of claim 1, wherein:
the flow of packets comprises a first portion of the flow of the packets from the first source and a second portion of the flow of packets from a second source, the second flow of packets comprising a temporally first packet of the second portion of the packets;
the flow of packets signals the synchronized rerouting time via data inserted in a field of the temporally first packet of the second portion of the packets;
the rerouting time is synchronized by the controller commanding insertion of data into the field of the temporally first packet of the second portion of packets.

14. A system for re-routing a flow of packets at a rerouting time, comprising:
a switch, comprising:
one or more input ports for accepting the packets from a source;
one or more output ports for providing the packets to a destination;
a processor, communicatively coupled to the input ports and the output ports and to a memory storing instructions wherein the processor executes instructions for:
routing the flow of packets from the one or more input ports to the one or more output ports via the switch according to a switch flow rule;
receiving an updated switch flow rule from a controller before the rerouting time, the updated switch flow rule defining the re-routing of the flow of packets; and
rerouting the flow of packets according to the updated switch flow rule at a rerouting time indicated by a packet of the accepted flow of packets;
wherein the rerouting time is synchronized by the controller commanding the source to change the packet in the flow of packets at the rerouting time.

15. The system of claim 14, wherein each packet in the flow of packets comprises a header including a field having a value indicating the rerouting time.

16. The system of claim 15, wherein the rerouting time is determined from a comparison between the value and a clock value.

17. The system of claim 15, wherein the rerouting time is indicated by a change in the value of the field of the packet from a value of the field of another packet temporally preceding the packet in the flow of packets.

18. The system of claim 17, wherein the value of the field of the flow of packets comprises an index value.

19. The system of claim 18, wherein the index value is a serial index value.

20. The system of claim 18, wherein:
the index value of the packet of the accepted and unrerouted flow of packets matches an index value of a first source routing rule transmitted to a first source from the controller before accepting the flow of packets from the first source in the switch; and
the index value of the another packet of the rerouted flow of packets matches an index value of a second source routing rule transmitted to the first source prior to the rerouting time.

21. The system of claim 20, wherein the second source routing rule having the index is transmitted to the first source at the rerouting time to initiate the rerouting of the flow of packets.

22. The system of claim 20, wherein:
the index value of the first source routing rule matches an index value of the first switch routing rule; and
the index value of the second source routing rule matches an index value of the second switch routing rule.

23. The system of claim 22, wherein the index value comprises a user datagram protocol (UDP) source port.

24. The system of claim 14, further comprising receiving a confirmation that the updated switch flow rule has been received and established in the switch.

25. The system of claim 14, wherein the flow of packets includes a vertical blanking interval, and the rerouting time is during the vertical blanking interval.

26. The system of claim 14, wherein:
the flow of packets comprises a first portion of the flow of the packets from the first source and a second portion of the flow of packets from a second source, the second flow of packets comprising a temporally first packet of the second portion of the packets;
the flow of packets signals the synchronized rerouting time via data inserted in a field of the temporally first packet of the second portion of the packets;
the rerouting time is synchronized by the controller commanding insertion of data into the field of the temporally first packet of the second portion of packets.

27. A method of re-routing a flow of packets in a packet-switched network at a rerouting time, comprising:
transmitting a switch routing rule to a switch receiving the flow of packets from a source, the switch routing rule describing a routing of the flow of packets and having a first index;
transmitting a source routing rule to the source of the flow of packets prior to the rerouting time, the source routing rule having the first index;
transmitting an updated switch routing rule describing the rerouting of the flow of packets to the source before the rerouting time, the switch routing rule having a second index; and
transmitting an updated source routing rule to the source of the flow of packets, the updated source routing rule having the second index for inclusion in the flow of packets at the rerouting time.

28. A system for re-routing a flow of packets at a rerouting time, comprising:
a switch, comprising:
a plurality of ports for receiving the flow of packets from at least one source and routing the received packets among the plurality of ports according to a switch routing rule at a time identified by an index in a packet of the flow of packets when the packet having the index is received in the switch;
a controller, communicatively coupled to the switch, for:
generating the switch routing rule identified by the index and providing the switch routing rule and index to the switch prior to the rerouting time; and
providing the index to a source of the flow of packets.

29. The system of claim 28, further comprising:
the source of the flow of packets, the source of the flow of packets for accepting a source routing rule and the index and for inserting the index in the packet of the flow of packets at the rerouting time to signal the switch to reroute the flow of packets.

30. The system of claim 29, wherein the index is accepted by the source from the controller at the rerouting time.

31. A method of re-routing a flow of packets in a packet switched network from at least one of a plurality of inputs, each coupled to an associated source to at least one of a plurality of outputs, each coupled to an associated destination, comprising:
transmitting, from a controller, a first source routing rule to the plurality of sources, the first source routing rule defining a routing of the flow of packets among the plurality of sources and the plurality of destinations;
accepting a first portion of the flow of packets in a switch, each of the packets the first portion of the flow of packets comprising a field having a first value;
routing the flow of packets to a first destination via the switch according to a switch flow rule;
transmitting an updated switch flow rule from the controller to the switch before the rerouting time, the updated switch flow rule defining the rerouting of the flow of packets;
transmitting a second source routing rule to the plurality of sources, the second source routing rule defining a re-routing of the flow of packets from the plurality of sources to the plurality of destinations;
accepting a second portion of the flow of packets in the switch, at least the first packet of the second portion of the flow of packets comprising the field having a second value; and
rerouting the second portion of the flow of packets according to the switch flow rule at a rerouting time indicated by the second value of the accepted packets.

32. The method of claim 31, wherein:
the first value comprises an index value of the first source routing rule; and
the second value comprises an index value of the second source routing rule.

33. The method of claim 32, wherein:
the index value of the first source routing rule matches an index value of the first switch routing rule; and
the index value of the second source routing rule matches an index value of the second switch routing rule.

34. The method of claim 32, wherein the index of the first source routing rule and the index value of the second source routing rule are in a series, and the second source routing rule follows the first index routing rule in the series.

35. The method of claim 32, wherein the index value of the first source routing rule and the index value of the second source routing rule comprise a user datagram protocol (UDP) source port.

36. The method of claim 31, wherein:
the first portion of the flow of packets is from a first source;
the second portion of the flow of packets is from a second source;
the first portion of the flow of packets is routed from the first source to the first destination; and
the second portion of the flow of packets is re-routed from the second source to the first destination.

37. The method of claim 36, wherein:
the rerouting time is synchronized between the first source and the second source by transmitting a command message from the controller to the sources to insert the second value into the flow of packets.

38. The method of claim 36, wherein:
the rerouting time is synchronized between the first source and the second source by transmitting the second source routing rule from the controller to the plurality of sources at the rerouting time.

39. The method of claim 36, wherein:
the rerouting time is synchronized between the first source and the second source by:
determining, at the source, a beginning of a vertical blanking interval; and
inserting the second value into the flow of packets at the determined vertical blanking interval.

40. The method of claim 31, wherein second portion of the flow of packets is rerouted according to the switch flow rule at a rerouting time determined from a comparison between the second value and a clock value.

* * * * *